United States Patent
Choi et al.

(10) Patent No.: US 10,545,303 B2
(45) Date of Patent: Jan. 28, 2020

(54) OPTICAL CABLE AND OPTICAL CABLE ASSEMBLY HAVING THE SAME

(71) Applicant: SAMSUNG ELECTRONICS CO., LTD., Suwon-si, Gyeonggi-do (KR)

(72) Inventors: Jung-hwa Choi, Pyeongtaek-si (KR); Chang-hun Bae, Yongin-si (KR); Young-ki Ko, Seongnam-si (KR); Byung-ju Kwak, Suwon-si (KR); Sun-woo Kim, Suwon-si (KR); Woo-sub Bang, Hwaseong-si (KR); Sung-ki Son, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/831,862

(22) Filed: Dec. 5, 2017

(65) Prior Publication Data

US 2018/0188461 A1 Jul. 5, 2018

(30) Foreign Application Priority Data

Jan. 3, 2017 (KR) .................... 10-2017-0000798

(51) Int. Cl.
*G02B 6/44* (2006.01)
*G02B 6/38* (2006.01)

(52) U.S. Cl.
CPC ......... *G02B 6/4401* (2013.01); *G02B 6/3826* (2013.01); *G02B 6/4415* (2013.01); *G02B 6/4436* (2013.01)

(58) Field of Classification Search
None
See application file for complete search history.

(56) References Cited

U.S. PATENT DOCUMENTS

| | | | |
|---|---|---|---|
| 6,424,768 B1 * | 7/2002 | Booth | G02B 6/4427 385/102 |
| 8,472,768 B2 | 6/2013 | Kai et al. | |
| 8,718,427 B2 | 5/2014 | Paschal et al. | |
| 2001/0038739 A1 | 11/2001 | Jamet | |
| 2005/0117858 A1 | 6/2005 | Lee et al. | |
| 2009/0010602 A1 * | 1/2009 | Nothofer | G02B 6/4402 385/109 |

(Continued)

FOREIGN PATENT DOCUMENTS

| | | |
|---|---|---|
| CN | 105931743 A | 9/2016 |
| JP | 2014-109751 | 6/2014 |

(Continued)

OTHER PUBLICATIONS

ISA Written Opinion dated Apr. 13, 2018 for PCT/KR2017/015473.

(Continued)

*Primary Examiner* — Chad H Smith
(74) *Attorney, Agent, or Firm* — Nixon & Vanderhye P.C.

(57) ABSTRACT

An optical cable and an optical cable assembly having the same are provided. The optical cable includes a plurality of optical fibers each of which includes a core, a clad arranged on an outside of the core, and a coating layer arranged on an outside of the clad; a substantially transparent sheath in which the plurality of optical fibers are arranged; and a substantially transparent filler configured to fill a space between the sheath and the plurality of optical fibers.

18 Claims, 6 Drawing Sheets

(56) References Cited

U.S. PATENT DOCUMENTS

| | | | | |
|---|---|---|---|---|
| 2012/0183302 A1* | 7/2012 | McColloch | .......... | G02B 6/4277 |
| | | | | 398/136 |
| 2012/0205825 A1* | 8/2012 | Nagafuji | .............. | G02B 6/3855 |
| | | | | 264/1.25 |
| 2013/0168537 A1 | 7/2013 | Shin | | |
| 2013/0259427 A1 | 10/2013 | Lam et al. | | |
| 2014/0092565 A1 | 4/2014 | Nakashima et al. | | |
| 2015/0131955 A1* | 5/2015 | Bennett | .................. | G02B 6/001 |
| | | | | 385/123 |
| 2015/0315061 A1* | 11/2015 | Hoover | ............. | C03B 37/01211 |
| | | | | 65/403 |
| 2016/0202433 A1 | 7/2016 | Wang | | |
| 2017/0299833 A1 | 10/2017 | Tsukamoto et al. | | |

FOREIGN PATENT DOCUMENTS

| | | |
|---|---|---|
| JP | 2016-075785 | 5/2016 |
| KR | 10-2004-0042366 | 5/2004 |
| KR | 10-0473808 | 3/2005 |
| KR | 10-2008-0027328 | 3/2008 |
| KR | 10-2012-0044363 | 5/2012 |
| KR | 10-1597088 | 2/2016 |

OTHER PUBLICATIONS

ISA International Search Report dated Apr. 13, 2018 for PCT/KR2017/015473.
Partial European Search Report dated May 29, 2018 for EP Application No. 17202617.1.
Extended European Search Report for EP Application No. 17202617.1 dated Oct. 11, 2018.

* cited by examiner

OPTICAL CABLE AND OPTICAL CABLE ASSEMBLY HAVING THE SAME

CROSS-REFERENCE TO RELATED APPLICATION

This application is based on, and claims priority under 35 U.S.C. § 119 to, Korean Patent Application No. 10-2017-0000798 filed on Jan. 3, 2017 in the Korean Intellectual Property Office, the disclosure of which is incorporated herein by reference in its entirety.

TECHNICAL FIELD

The present disclosure relates generally to an optical cable, and more particularly to an invisible optical cable and/or an optical cable assembly having the same for example.

BACKGROUND

Recently, in the Internet communication market, paradigm has been changed from the existing megabit class to gigabit class. To keep pace with such a change in the Internet communication market, optical cables are used on the Internet lines in replacement of the existing copper cables.

In general, an optical cable for communication may have an optical cable mode that is classified into a single mode and a multi-mode. The single mode is a mode in which one light mode for guiding light in the optical cable exists and a long-distance transmission becomes possible, and the multi-mode is a mode in which several light modes for guiding light in the optical cable exist to facilitate short-distance transmission.

Although the optical cable in the multi-mode is used to rapidly transfer a large amount of information, it is general that the multi-mode optical cable has a double sheath structure in which an internal sheath having a large number of optical fibers mounted therein is mounted in an external sheath. Accordingly, the volume of the optical cable is greatly increased in proportion to the number of optical fibers mounted therein, and since the optical cable has the double sheath structure, the optical cable manufacturing process is complicated, and the manufacturing cost is increased.

Further, among optical cables in the related art, since an indoor optical cable installed in a building or an office is easily visible to the naked eye, it may be ill-matched with the surrounding environment or may deteriorate interior effects.

SUMMARY

Exemplary embodiments of the present disclosure overcome the above disadvantages and other disadvantages not described above, and provide an optical cable which has a simple structure and a minimized outer diameter and is invisibly formed, and an optical cable assembly having the same.

According to an aspect of the present disclosure, an optical cable includes a plurality of optical fibers each of which includes a core, a clad arranged on an outside of the core, and a coating layer arranged on an outside of the clad; a substantially transparent sheath in which the plurality of optical fibers are arranged; and a substantially transparent filler configured to fill a space between the sheath and the plurality of optical fibers.

The optical cable according to the aspect of the present disclosure may further include a tensile line inserted into the filler.

The tensile line may be formed to be penetrated by the light.

According to another aspect of the present disclosure, an optical cable assembly includes first and second photoelectric converters; and an optical cable configured to connect the first and second photoelectric converters to each other, wherein the optical cable includes a plurality of optical fibers each of which includes a core, a clad arranged on an outside of the core, and a coating layer arranged on an outside of the clad; a sheath in which the plurality of optical fibers are arranged to be penetrated by light; and a filler configured to fill a space between the sheath and the plurality of optical fibers to be penetrated by the light.

Each of the first and second photoelectric converters may include a circuit board; a shield can configured to surround the circuit board; and a housing in which the shield can is disposed.

The housing may be formed to be penetrated by the light.

A plug that projects from one end of the housing to outside may be formed to extend from the shield can.

A trumpet-shaped guide, of which the width is gradually narrowed toward an inside of the housing, may be formed on the other end of the housing.

An inner circumferential surface of the trumpet-shaped guide may be a curved surface.

The circuit board may be mounted with a lens system configured to connect the optical cable and the circuit board to each other; an optical element system configured to emit and/or absorb light; and an optical drive IC configured to operate using an optical signal.

The plurality of optical fibers may be branched from opposite ends of the optical cable inserted into the first and second photoelectric converters.

The plurality of optical fibers may be fixed to lenses of the lens system.

The lens system may be disposed between the optical cable and the optical element system.

Each of the first and second photoelectric converters may further include a first support disposed in the shield can to support the circuit board; and a second support disposed outside the shield can to guide the optical cable into the shield can.

The first support may include left and right support pieces, and surfaces of the left and right support pieces in the shield can, the surfaces facing each other, gradually go away from each other moving in a direction in which the optical cable is to be inserted into the lens system.

The second support may be formed of a transparent material.

A vent hole may be formed on the housing to dissipate heat generated from the optical drive IC.

Anti-skid projections may be formed on an outer surface of the housing.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like parts throughout the several views, and wherein.

DETAILED DESCRIPTION

Figure 1:
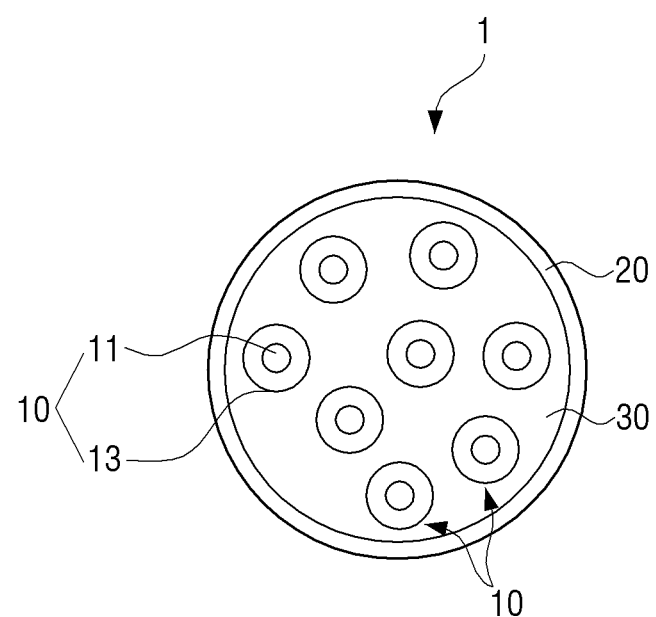
FIG. 1 is a cross-sectional view illustrating an optical cable according to an embodiment of the present disclosure.

Hereinafter, an optical cable and an optical cable assembly having the same according to example embodiments of the present disclosure will be described in greater detail with reference to the accompanying drawings.

The embodiments described hereinafter are for purposes of example to help understanding of the present disclosure, and it should be understood that the present disclosure may include various modifications, equivalents, and/or alternatives of the embodiments of the present disclosure. In describing the present disclosure, related well-known functions or constituent elements are not described in detail since they would obscure the subject matter of the present disclosure in unnecessary detail. Further, in order to help understanding of the present disclosure, sizes of some constituent elements illustrated in the drawings may be exaggerated for clarity in explanation.

Hereinafter, an optical cable 1 according to an example embodiment of the present disclosure will be described, and then an optical cable assembly 10 having the optical cable 1 will be described in detail.

Figure 2:
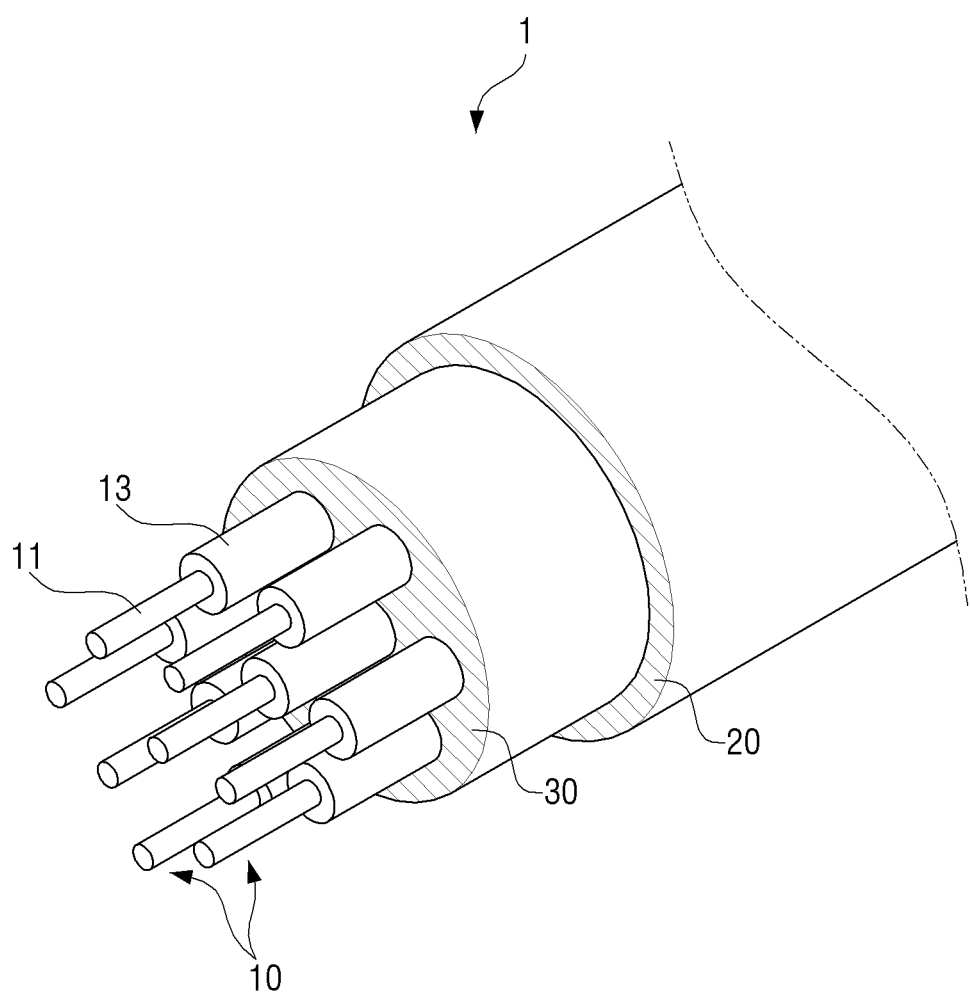
FIG. 2 is a perspective view illustrating an interior of an optical cable according to an embodiment of the present disclosure.

FIG. 1 is a cross-sectional view illustrating an optical cable according to an example embodiment of the present disclosure, and FIG. 2 is a perspective view illustrating an interior of an optical cable according to an embodiment of the present disclosure.

An optical cable 1 according to an example embodiment of the present disclosure, referring to FIGS. 1-2 for example, may be invisibly formed through light penetration so as to be substantially transparent. In this case, the diameter of the optical cable 1 may be minimized so that the optical cable 1 becomes further invisible.

Referring to FIGS. 1 and 2, an optical cable 1 is configured to include a plurality of transparent optical fibers 10, a sheath 20 in which the plurality of optical fibers 10 are arranged to be penetrated by light, and a transparent filler 30 configured to fill a space between the sheath 20 and the plurality of optical fibers 10 to be penetrated by the light.

Here, the sheath 20 and the filler 30, which are penetrated by light, may be considered as transparent or substantially transparent. The transparent sheath 20 and the transparent filler 30 may be formed to be penetrated by only a part of the light or to be penetrated by only light having a specific wavelength.

The optical fiber 10 is a transmission medium of an optical signal, and may include a transparent core 11 and a transparent clad 13.

The elongated core 11 is to transmit the optical signal. The core 11 is located in the center of the elongated optical fiber 10, and has a relatively high refractive index compared to the clad 13 and/or filler 30. The optical signal is totally reflected and proceeds in a length direction of the elongated optical cable 1 inside the core 11.

The clad 13 is to confine the optical signal in the core 11. The clad 13 is disposed outside the core 11, and has a relatively low refractive index (n, measured at 550 nm) compared to the core 11. The clad 13 is disposed to completely surround the core 11 along an outer circumference of the core 11, for example as shown in cross section in FIGS. 1-2.

Each of the optical fibers 10 has a transection (cross section that is vertical to the length direction) having an outline that is substantially in the form of a circle (including an ellipse and a concavo-convex circle). The core 11 is in the form of a circular bar, and the clad 13 is in the form of a circular tube, as viewed in cross section, for example as shown in FIGS. 1-2. The core 11 and the clad 13 are disposed in a concentric manner relative to each other.

The sheath 20 is located at an outermost portion of the optical cable 1, and protects the plurality of optical fibers 10 disposed in the sheath 20 from an external environment. The sheath 20 may, for example, be integrally formed of a single material through an extrusion process. It is preferable that the sheath 20 has high tensile strength and high hardness.

The sheath 20 may be substantially transparent or transparent. That is, the sheath 20 may be formed so that light that is incident to the sheath 20 penetrates the sheath 20. In this case, the plurality of optical fibers 10 and the filler 30 that are disposed inside the sheath 20 are formed to be also penetrated by the light, and thus are also transparent or substantially transparent to light. Accordingly, the light that is incident to the optical cable 1 penetrates through the optical cable 1.

Accordingly, a user may recognize the optical cable 1 as a bottom surface on which the optical cable 1 is disposed or the surroundings through recognition of the light that penetrates the coating in accordance with the user's viewing angle. Accordingly, it is difficult that the optical cable 1 itself is visible to the naked eye.

The sheath 20 may be formed of a light penetration material. Specifically, the sheath 20 may be formed of polyvinyl chloride (PVC) for example.

The sheath 20 may be formed in a tube shape, circularly surrounding the plurality of optical fibers 10 and filler for example, and form a specific protection film. Since the external sheath 20 has a circular structure in example embodiments, an area that receives pressure from the outside is minimized and/or reduced, and since it circularly surrounds the plurality of optical fibers 10, external pressure applied to the optical fibers is reduced.

The optical cable 1 is formed so that the plurality of optical fibers 10 may move to some extent within the single sheath 20. In an example embodiment of the present disclosure, since the optical cable does not include a separate tube, slot, or ribbon for accommodating core wires of the several optical fibers 10, the plurality of optical fibers 10 are not accommodated by a separate member, but are directly accommodated in the single external sheath 20. Accordingly, the optical fibers 10 are loosely disposed relative to each other so as not to have a specific fixed directivity. Accordingly, the plurality of optical fibers 10 do not necessarily have a constant array as in FIG. 1, but may be irregularly disposed in the sheath 20.

The optical cable 1 having the above-described structure according to an example embodiment of the present disclosure has the advantage that it can increase the number of core wires at the same outer diameter as compared with a multi-core optical cable using a loose tube or ribbon optical fiber bundle according to the optical cable in the related art. Further, the optical cable 1 according to an example embodiment of the present disclosure has the advantage that the outer diameter thereof becomes smaller as compared with the multi-core optical cable in the related art in which the same number of optical fibers are built.

Accordingly, since the optical cable 1 according to an example embodiment of the present disclosure is configured so that the plurality of optical fibers 10 can be disposed in one external sheath 20, the thickness of the optical cable 1 can be minimized, and the manufacturing cost can be reduced.

The filler 30 is to protect the plurality of optical fibers 10 from an external impact and to absorb moisture that may have permeated into the sheath 20. Further, the filler 30 may be a medium to increase the strength of the optical cable 1.

The filler 30 may be disposed in an empty space in the sheath 20 to surround the respective optical fibers 10. A plurality of fillers 30 may be provided to fill a space between the sheath 20 and the plurality of optical fibers 10 in an example embodiment. The filler 30 may be in the form of a yarn, such as aramid fiber or glass fiber, to have a waterproof characteristic. The filler 30 may be formed of a light penetrable material and thus may be transparent or substantially transparent. The filler 30 and the sheath 20 that surrounds the filler 30 may thus be transparently formed. In this case, the optical cable 1 itself becomes transparent to lower visibility of the optical cable 1, in the visible spectrum.

The filler 30 provides a tensile force to prevent/reduce the sheath 20 from being lengthened.

The plurality of optical fibers 10, the sheath 20, and the filler 30, which constitute the optical cable 1, may all be formed of transparent materials in example embodiments. Specifically, the core 11 and the clad 13, which constitute the optical fiber 10, may be formed of transparent or substantially transparent materials.

The plurality of optical fibers 10, the filler 30, and the sheath 20 may be formed of transparent materials so that light transmittance of the sheath 20 disposed at the outermost portion of the optical cable 1 is higher than light transmittance of the plurality of optical fibers 10 and the filler 30 disposed inside the sheath 20. As the light transmittance of the filler 30 and the sheath 20 becomes higher, the visibility of the optical cable 1 becomes further lowered.

In the case of installing the optical cable 1 that is made of a transparent or substantially transparent material indoors, on an outer wall of a building, or in a passage, the transparent optical cable 1 may be permeated with light in the neighborhood of a place where the optical cable 1 is wired. Accordingly, the optical cable 1 is not easily visible to the user's eye, and indoor and outdoor interior effects are not reduced.

As described above, the optical cable 1 according an example embodiment of the present disclosure is formed so that the plurality of optical fibers 10 are formed to be surrounded by one sheath 20, and the sheath 20 is formed to be penetrated by the light. Accordingly, the outer diameter of the multi-core optical cable 1 is minimized with transparency, and thus it becomes possible to provide the invisible optical cable that is not easily visible to a user's eye.

In addition, the optical cable 1 according to an embodiment of the present disclosure may be formed to reflect external light so that it is difficult for the user's naked eye to determine the optical cable 1. As a detailed example, the optical cable 1 may be configured to include the plurality of optical fibers 10, the sheath 20 in which the plurality of optical fibers 10 are disposed to reflect the external light, and the filler 30 that fills a space between the sheath 20 and the plurality of optical fibers 10.

The sheath 20 may be colorless, and may be made of a material having a specific reflection rate. Here, "colorless" may include both "transparent" and "opaque". The sheath 20 may be formed to have a specific reflection rate, and reflects light that is incident to the sheath 20. Accordingly, the plurality of optical fibers 10 and the filler 30 that are disposed inside the sheath 20 are not well seen by the naked eye from the outside.

Specifically, the sheath 20 reflects again the light that is reflected from a bottom surface on which the optical cable 1 is disposed or the surroundings and then is incident into the sheath 20. Since the sheath 20 is formed to reflect the external light, the optical cable 1 may become invisible to the user's eye. Since the user recognizes the light that is reflected from the sheath 20 of the optical cable 1 in accordance with the user's viewing angle, it is difficult that the optical cable 1 itself is visible to the naked eye.

In this case, the filler 30 may be formed transparently or opaquely. Further, the filler 30 may be formed with a color, and specifically, may be in the form of a white or substantially white yarn. If the filler 30 is made of an opaque material, only the sheath 20 may be formed to reflect the external light.

Since the sheath 20 reflects the external light, the interior of the sheath 20 is difficult to be recognized by a naked eye from the outside, and the optical cable 1 itself that is surrounded by the sheath 20 may not be visible to the user's eye.

In the case of installing the optical cable 1 that is formed of a material reflecting the external light indoors, on an outer wall of a building, or in a passage, the optical cable 1 may reflect the light that is incident to the sheath 20. Accordingly, the optical cable 1 is not easily visible to the user's eye, and indoor and outdoor interior effects are not reduced.

As described above, since the optical cable 1 according to an example embodiment of the present disclosure is formed so that the plurality of optical fibers 10 are formed to be surrounded by one sheath 20 and the sheath 20 is formed to reflect the external light, the outer diameter of the multi-core optical cable 1 is minimized to reflect the external light, and thus it becomes possible to provide a substantially invisible optical cable that is not easily visible to the user's eye.

Figure 3:
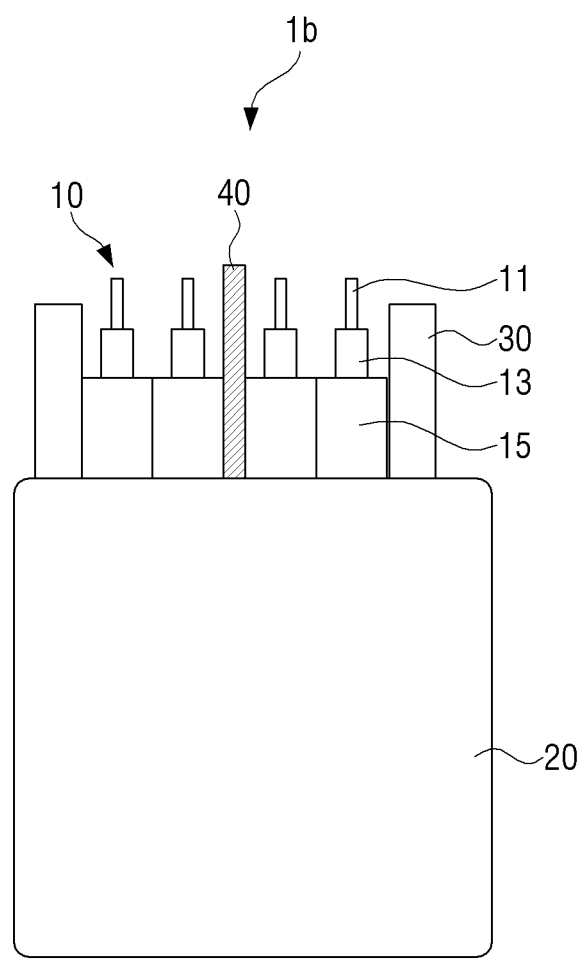
FIG. 3 is a view illustrating an example of an optical cable further including a transparent coating layer surrounding a clad.

FIG. 3 is a view illustrating an example of an optical cable further including a transparent coating layer surrounding a clad.

Referring to FIG. 3, an optical cable 1b may further include a coating layer 15 surrounding the respective optical fibers 10, and a tensile line 40 inserted into the filler 30.

In this case, each of the optical fibers 10 may be composed of a core 11, a clad 13, and a coating layer 15. The core 11 may have a first light refractive index, and the clad 13 may have a light refractive index (n) that is lower than the refractive index (n) of the core 11. The coating layer 15 is a transparent resin layer surrounding the clad 13, and may be formed to have a refractive index (n) that is different from the refractive index (n) of the clad 13. Refractive index (n) values herein are measured at 550 nm. Specifically, the coating layer 15 may have a light refractive index that is lower than the refractive index of the clad 13.

Since the coating layer 15 can serve as a rigid body, it may improve the tensile strength of the optical cable 1 together with the filler 30. As a material of the coating layer 15, polymer compounds, such as polyvinyl chloride, polyester elastomer (Hytrel), polyester, polyethylene, and nylon, may be used, each either alone or in any combination.

The tensile line 40 may be located in the center of the optical cable 1b to provide a tensile force/strength. The tensile line 40 may be made of fiberglass reinforced plastic (FRP), and may be transparently formed in the same manner as the remaining configurations, in example embodiments.

The tensile line 40 may improve the tensile force and compression strength of the optical cable 1b, and may help peel-off (stripping off, removal or separation) of an external sheath 20. That is, a worker may peel off the external sheath 20 in the length direction of the optical cable 1b by pulling the tensile line 40 after partially peeling off the external sheath 20 of the optical cable 1b.

In the optical cable 1b according to an example embodiment of the present disclosure, the plurality of optical fibers 10 may be loosely disposed within the external sheath 20, and thus the optical cable 1b may be formed to be slimmer than the optical cable in the related art having the same or greater strength even if the tensile line 40 or the coating layer 15 is further included.

Figure 4:
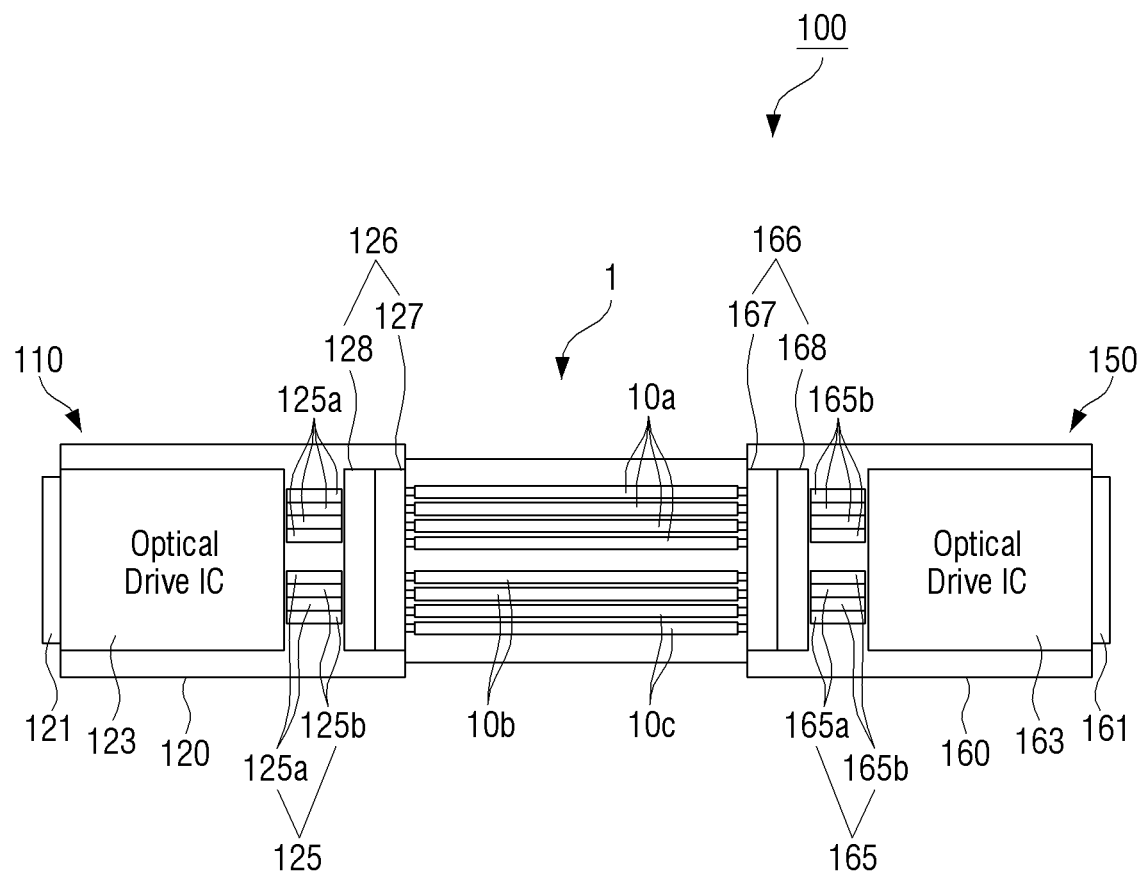
FIG. 4 is a view schematically illustrating an optical cable assembly structure according to an embodiment of the present disclosure.
Figure 5:
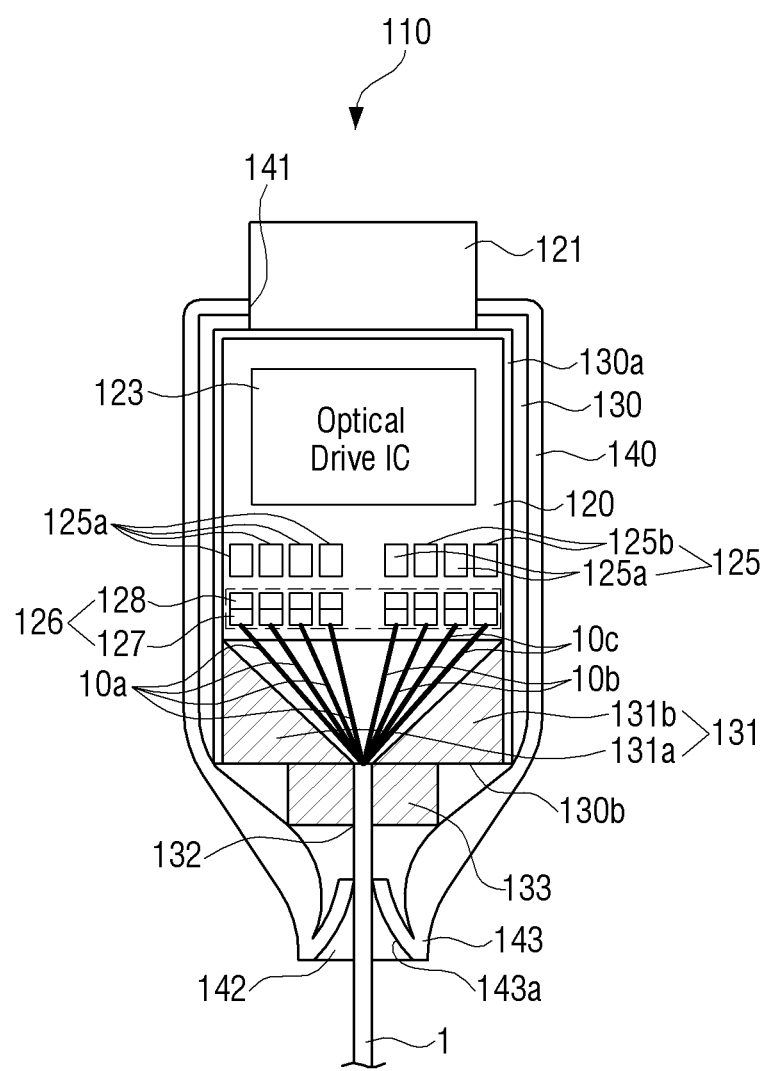
FIG. 5 is a view illustrating an interior of a first photoelectric converter illustrated in FIG. 4.

FIG. 4 is a view schematically illustrating an optical cable assembly structure according to an example embodiment of the present disclosure, and FIG. 5 is a view illustrating the interior of a first photoelectric converter as illustrated in FIG. 4.

An optical cable assembly 100 according to an example embodiment of the present disclosure includes a first photoelectric converter 110, a second photoelectric converter 150, and an optical cable 1 (e.g., see FIGS. 1-3 for an example cable 1).

At least the optical cable 1 connects the first photoelectric converter 110 and the second photoelectric converter 120 to each other. For this, to opposite ends of the optical cable 1, the first photoelectric converter 110 and the second photoelectric converter 150 are coupled, directly or indirectly.

The optical cable may be the optical cable 1 penetrated by light as described above or the optical cable 1 that reflects an external light, as described in connection with any of FIGS. 1-3. The optical cable may be the optical cable 1 including the sheath 20 penetrated by the light or the optical cable 1 including the sheath 20 that reflects the external light. Further, the optical cable may further include a tensile line 40 like the optical cable 1b of FIG. 3.

Hereinafter, description will be made on the assumption that the optical cable assembly 100 is provided with the optical cable 1 penetrated by the light, but is not limited thereto. The optical cable assembly 100 may be provided with the optical cable 1 that reflects the light.

The optical cable assembly 100 according to an example embodiment of the present disclosure corresponds to a bidirectional optical transceiver. For convenience in explanation, it is assumed that the first photoelectric converter 110 is connected to a transmitter of an external device (not illustrated), and the second photoelectric converter 150 is connected to a receiver of another external device (not illustrated).

Referring to FIGS. 4 and 5, the first photoelectric converter 110 may be provided with a circuit board 120 mounted with a lens unit 126 connecting the optical cable 1 and the circuit board 120 to each other, an optical element unit 125 configured to emit or absorb light, and an optical drive integrated circuit (IC) 123 configured to operate using an optical signal.

The lens unit 126 may be composed of a plurality of jumpers 127 and a plurality of lenses 128. The plurality of jumpers 127 are respectively connected to the plurality of optical fibers 10 to connect (directly or indirectly) the optical fibers 10 to the circuit board 120. The plurality of lenses 128 are disposed to correspond to the plurality of jumpers 127 to transfer the optical signals from the circuit board 120 to the optical cables 1.

The optical element unit 125 may be composed of a plurality of vertical cavity surface emitting laser (VCSEL) chips 125a configured to receive an electrical signal and to generate laser, and a plurality of photodiode (PD) chips 125b configured to receive the optical signal generated from the VCSEL chip 125a and to output an electrical signal.

In the same manner as the first photoelectric converter 110, the second photoelectric converter 150 may be provided with a circuit board 160 mounted with a lens unit 166 connecting the optical cable 1 and the circuit board 160 to each other, an optical element unit 165 configured to emit or absorb light, and an optical drive integrated circuit (IC) 163 configured to operate using an optical signal.

The lens unit 166 may be composed of a plurality of jumpers 167 and a plurality of lenses 168. The plurality of jumpers 167 are respectively connected to the plurality of optical fibers 10 to connect the optical fibers 10 to the circuit board 160. The plurality of lenses 168 may be disposed to correspond to the plurality of jumpers 167 to transfer the optical signal from the optical cable 1 to the circuit board 160.

The optical element unit 165 may be composed of a plurality of vertical cavity surface emitting laser (VCSEL) chips 165a configured to receive an electrical signal and to generate laser, and a plurality of photodiode (PD) chips 165b configured to receive the optical signal generated from the VCSEL chip 165a and to output an electrical signal.

Referring to FIG. 4, an example operation of the optical cable assembly 100 will be described as follows.

An electrical signal (i.e., video data) of a transmitter connected to the first photoelectric converter 110 is converted into an optical signal by the VCSEL chip 125a of the optical element unit 125 under the control of the optical drive IC 123 disposed on the circuit board 120 of the first photoelectric converter 110, and the converted optical signal is reflected by the lens 128 of the lens unit 126 and is vertically emitted upward from the VCSEL chip 125a to be transmitted to the plurality of optical fibers 10 through the jumpers 127.

The optical signal transmitted from the first photoelectric converter 110 is transmitted to the second photoelectric converter 150 through the optical cable 1. The optical cable 1 that connects the first photoelectric converter 110 and the second photoelectric converter 150 to each other includes the plurality of optical fibers 10. Specifically, the plurality of optical fibers 10 may be eight optical fibers. Among them, four optical fibers 10a are to transfer a video signal. The optical fibers 10a for transferring the video signal may transmit video and audio signals, and one optical fiber 10a can transmit information the amount of which corresponds to 12.5 G. Among the four remaining optical fibers 10b and 10c, two 10b of them transmit a data signal, and the remaining two 10c of them transmit a signal of a signal detector, in an example embodiment.

The second photoelectric converter 150 receives the optical signal transmitted from the optical cable 1, and the transmitted optical signal is transferred to respective lenses 168 by the jumpers 167. The optical signal is vertically reflected downward through the lenses 168 to be incident to the PD chip 165*b* of the circuit board 160.

The incident optical signal is converted into an electrical signal through amplification of output current of the PD chip 165*b* under the control of a transimpedance amplifier (TIA) (not illustrated) on the circuit board. The converted electrical signal is input to a receiver (i.e., display) connected to the second photoelectric converter 150.

The deployment of the internal configurations of the first photoelectric converter 110 and the second photoelectric converter 150 will be described along a signal transfer direction.

In the first photoelectric converter 110, the optical drive IC 123, the optical element unit 125, and the lens unit 126 are successively disposed in accordance with a direction that is directed from a plug 121 for receiving the electric signal transferred from the transmitter to the optical cable 1 for transferring the optical signal.

In the second photoelectric converter 150, the lens unit 166, the optical element unit 165, and the optical drive IC 163 are successively disposed in accordance with a direction that is directed from the optical cable 1 to the receiver.

The first photoelectric converter 110 may be provided with plug 121 connected to the transmitter, and the second photoelectric converter 150 may be provided with plug 161 connected to the receiver. In the optical cable assembly 100 according to an example embodiment of the present disclosure, the first and second photoelectric converters 110 and 150 may be provided with the plugs 121 and 161 for transferring the electrical signals through final output of the electrical signals. The electrical signals converted from the optical signals of the optical cable 1 may be transferred to the transmitter and the receiver through the plugs 121 and 161. Further, an external power input through the plugs 121 and 161 may be supplied to the optical drive ICs 123 and 163.

The configurations and structures of the first photoelectric converter 110 and the second photoelectric converter 150 may be the same. For convenience in explanation, explanation will now be made only with respect to the first photoelectric converter 110.

Referring to FIG. 5, each of the first photoelectric converter 110 and the second photoelectric converter 150 may include a circuit board 120 or 160, a shield can 130 configured to surround the circuit board, and a housing 140 in which the shield can is disposed.

On the circuit board 120, a lens unit 126 configured to connect the optical cable 1 and the circuit board 120 to each other, an optical element unit 125 configured to emit or absorb the light, and an optical drive IC 123 configured to operate using an optical signal are mounted. In this example case, the lens unit 126, the optical element unit 125, and the optical drive IC 123 are successively disposed in accordance with a direction connected from the optical cable 1 to the plug 121.

The plurality of optical fibers 10 may be branched from opposite ends of the optical cable 1 inserted into the first photoelectric converter 110 and the second photoelectric converter 150. In the branched optical cable 1, in an example embodiment, only the optical fibers 10 are disposed without the sheath 20 in the first photoelectric converter 110 and the second photo electric converter 150.

The optical fibers 10 surrounded by the sheath 20 may be branched from the optical cable 1, and then coupled to the lens unit 126 in a state where they are spaced apart for a predetermine distance from each other in order to prevent or reduce mutual interference between the plurality of optical fibers 10.

The plurality of optical fibers 10 are respectively connected to the respective lenses 128 of the lens unit 126. Specifically, the plurality of optical fibers 10 may be respectively connected to the plurality of lenses 128 disposed on the circuit board 120 through respective jumpers 127. The plurality of lenses 128 may be disposed on a portion that is opposite to a portion in which the plurality of optical fibers 10 are respectively coupled to the plurality of jumpers 127.

The optical element unit 125 may be disposed on a portion that is opposite to a portion where the plurality of optical fibers 10 are coupled to the lens unit 126. That is, the optical element unit 125 may be disposed at the rear end of the lens unit 126 based on the optical cable 1.

In the optical element unit 125, a VCSEL chip 125*a* that emits light may be disposed on the first photoelectric converter 110 connected to a transmitter, and a PD chip 165*b* that receives light transmitted from the VCSEL chip 125*a* may be disposed on the second photoelectric converter 150 connected to a receiver. In this case, a part of the optical element unit 125 of the first photoelectric converter 110 may include a PD chip 125*b* for receiving a data signal transferred from the receiver and a signal of a signal detector. In the same manner, a part of the optical element unit 125 of the second photoelectric converter 150 may include the VCSEL chip 125*a* for receiving the data signal transferred from the transmitter and the signal of the signal detector.

Since the optical cable assembly according to an example embodiment of the present disclosure is a bidirectional optical transceiver, the optical element units 125 of the first photoelectric converter 110 and the second photoelectric converter 150 may include the same number of VCSEL chips 125*a* and PD chips 125*b*.

The optical drive IC 123 may be disposed at the rear end of the optical element unit 125 based on the optical cable 1. In the first photoelectric converter 110, the optical drive IC 123 may convert the electric signal into current that is necessary for optical signal output, and in the second photoelectric converter 150, the optical drive IC 123 may convert the current that is output as the optical signal into an electrical signal.

In a shield can 130, a space is formed, in which the circuit board 120 and/or the branched plural optical fibers 10 can be disposed. The shield can 130 may prevent or reduce an electromagnetic interference (EMI) generated by the circuit board 120 or various kinds of elements mounted on the circuit board 120.

From one end 130*a* of the shield can 130, a plug 121 directly connected to the transmitter or the receiver may be formed to extend. The plug 121 may transmit or receive the electrical signal.

The other end 130*b* of the shield can 130 may be connected to the optical cable 1. In the shield can 130, a first support 131 for supporting the circuit board 120 may be disposed based on the other end 130*b* of the shield can 130 connected to the optical cable 1, and on an outside of the shield can 130, a second support 133 for guiding the optical cable 1 into the shield can 130 may be disposed.

The first support 131 may be to fixedly support the circuit board 120. One end of the first support 131 comes in contact with the circuit board 120, and the other end of the first support 131 comes in contact with the other end 130*b* of the shield can 130.

The first support 131 may include a left support piece 131*a* and a right support piece 131*b*. As the first support goes in a direction in which the optical cable 1 is inserted into the lens unit 126, opposite surfaces of the left support piece 131a and the right support piece 131b in the shield can 130 may be formed to gradually go away from each other. Specifically, the opposite surface of the left support piece 131a of the first support 131 may be formed to be inclined downward in a side surface direction of the shield can 130 from the other end 130b of the shield can 130 to the circuit board 120. In the same manner, the right support piece 131b may be formed to be inclined downward in the side surface direction of the shield can 130 from the other end 130b of the shield can 130 to the circuit board 120.

The first support 131 may be formed along a direction in which the optical fibers 10 are branched in a state where it is spaced apart from the branched optical fibers 10. Accordingly, the first support 131 may support the circuit board 120 even without interfering with the branched optical fibers 10.

The second support 123 may support the optical cable 1 that is inserted into the shield can 130. One end of the second support 133 may be formed to come in contact with the shield can 130, and the other end thereof may be formed to come in contact with an inner surface of the housing 140. On the second support 133, a second insertion hole 132 may be formed through which the optical cable 1 is inserted into the shield can 130.

Although the first and second supports 131 and 133 are described to be separately formed, they are not limited thereto, but may be integrally formed. Further, the first and second supports 131 and 133 may be formed of a transparent material. In this case, the housing 140 may also be formed of a transparent material to provide the optical cable assembly 100 that is invisible to the user's naked eye.

A space may be formed inside the housing 140 to accommodate the shield can 130. One end of the housing 140 may be connected to the transmitter or the receiver, and the other end of the housing may be connected to the optical cable 1. The housing 140 may be formed of a transparent or opaque material.

At one end of the connected housing 140, a plug hole 141 may be formed so that the plug 121 that may be formed to extend from the shield can 130 projects to the outside of the housing 140. If the plug 121 is connected to the transmitter, it receives the electrical signal from the transmitter, whereas if the plug 121 is connected to the receiver, it transmits the electrical signal to the receiver.

At the other end of the housing 140, a guide 143 for guiding the optical cable 1 into the housing 140 may be formed, and on the guide 143, a first insertion hole 142 may be formed. The optical cable 1 may be inserted into the first photoelectric converter 110 through the first insertion hole 142.

The guide 143 may be formed in a trumpet shape, of which the width is gradually narrowed toward the inside of the housing. The inner circumferential surface 143a of the guide 143 may be formed as a curved surface. Since the inner circumferential surface 143a of the guide 143 may be formed as the curved surface, damage and abrasion generated due to friction between the optical cable 1 and the guide 143 during movement of the optical cable 1 may be reduced.

Figure 6:
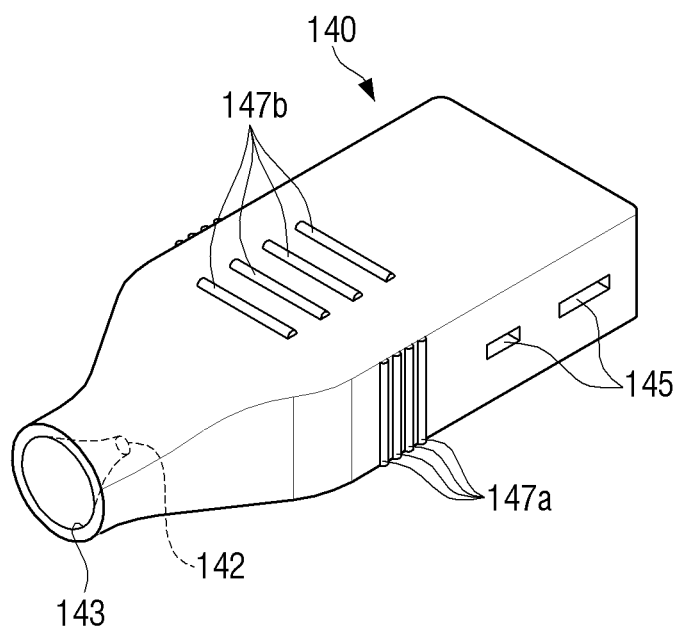
FIG. 6 is a perspective view illustrating a housing of an optical cable assembly illustrated in FIG. 5.

FIG. 6 is a perspective view illustrating an example housing of an optical cable assembly as illustrated in FIG. 5.

Referring to FIG. 6, the example housing 140 includes a space for accommodating a shield can 130. At one end of the housing 140, a plug hole 141 may be formed so that a plug 121 projects to outside, and at the other end of the housing 140, an optical cable 1 may be formed.

A vent hole 145 may be formed on an outer surface of the housing 140 to dissipate heat generated from an optical drive IC. FIG. 6 illustrates that the vent hole 145 may be formed on the side surface of the housing 140, but is not limited thereto. The vent hole 145 may be formed on the front or rear surface of the housing 140. Further, the vent hole 145 may be formed on not only the housing 140 but also the shield can 130.

Further, anti-skid projections 147a may be formed on an outer surface of the housing 140. In addition to the anti-skid projections 147a formed on the outer surface of the housing 140, anti-skid projections 147b that project from the outer surface may be formed on the front or rear surface of the housing. Accordingly, a user can connect the first or second photoelectric converter 110 or 150 to the transmitter or the receiver without hand skid.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An optical cable for transmitting video and audio data, comprising:
   a plurality of optical fibers each of which includes a core, a clad arranged on an outside of the core, and a coating layer arranged on an outside of the clad, the optical fibers configured for transmitting video and audio data;
   a sheath in which the plurality of optical fibers are arranged, wherein the optical fibers are loosely disposed relative to each other in the sheath so as to be irregularly disposed in the sheath; and
   a filler configured to fill a space between the inner surface of the sheath and the outer surfaces of the plurality of optical fibers so that the filler contacts both the inner surface of the sheath and the outer surfaces of the plurality of optical fibers;
   wherein the sheath and the filler are substantially transparent to visible light so as to reduce any visibility of the optical cable to a user's eye.

2. The optical cable as claimed in claim 1, further comprising a tensile line inserted into the filler.

3. The optical cable as claimed in claim 2, wherein the tensile line is substantially transparent to visible light.

4. An optical cable assembly comprising:
   first and second photoelectric converters; and
   an optical cable configured to connect the first and second photoelectric converters to each other,
   wherein the optical cable includes:
   a plurality of optical fibers each of which includes a core, a clad arranged on an outside of the core, and a coating layer arranged on an outside of the clad;
   a sheath in which the plurality of optical fibers are arranged, wherein the optical fibers are loosely disposed relative to each other in the sheath so as to be irregularly disposed in the sheath; and
   a filler configured to fill a space between the inner surface of the sheath and the outer surfaces of the plurality of optical fibers so that the filler contacts both the inner surface of the sheath and the outer surfaces of the plurality of optical fibers;
   wherein the sheath and the filler are substantially transparent to visible light so as to reduce any visibility of the optical cable to a user's eye.

5. The optical cable assembly as claimed in claim 4, wherein each of the first and second photoelectric converters comprises:
- a circuit board;
- a shield can configured to surround the circuit board; and
- a housing in which the shield can is disposed.

6. The optical cable assembly as claimed in claim 5, wherein the housing is formed to be penetrated by the light.

7. The optical cable assembly as claimed in claim 5, wherein a plug that projects from one end of the housing to an outside is formed to extend from the shield can.

8. The optical cable assembly as claimed in claim 5, wherein a trumpet-shaped guide, of which the width is gradually narrowed toward an inside of the housing, is formed on another end of the housing.

9. The optical cable assembly as claimed in claim 8, wherein an inner circumferential surface of the trumpet-shaped guide is a curved surface.

10. The optical cable assembly as claimed in claim 5, wherein the circuit board is mounted with:
- a lens system configured to connect the optical cable and the circuit board to each other;
- an optical element system configured to emit and/or absorb light; and
- an optical drive IC configured to operate using an optical signal.

11. The optical cable assembly as claimed in claim 10, wherein the plurality of optical fibers are branched from opposite ends of the optical cable inserted into the first and second photoelectric converters.

12. The optical cable assembly as claimed in claim 11, wherein the plurality of optical fibers are fixed to lenses of the lens system.

13. The optical cable assembly as claimed in claim 12, wherein the lens system is disposed between the optical cable and the optical element system.

14. The optical cable assembly as claimed in claim 10, wherein each of the first and second photoelectric converters further comprises:
- a first support disposed in the shield can to support the circuit board; and
- a second support disposed outside of the shield can to guide the optical cable into the shield can.

15. The optical cable assembly as claimed in claim 14, wherein the first support comprises left and right support pieces, and
surfaces of the left and right support pieces in the shield can, the surfaces facing each other, gradually go away from each other moving in a direction in which the optical cable is to be inserted into the lens system.

16. The optical cable assembly as claimed in claim 14, wherein the second support is formed of a transparent material.

17. The optical cable assembly as claimed in claim 5, wherein a vent hole is formed on the housing to dissipate heat generated from the optical drive IC.

18. The optical cable assembly as claimed in claim 8, wherein anti-skid projections are formed on an outer surface of the housing.

* * * * *